No. 780,143. PATENTED JAN. 17, 1905.
H. J. TIEMANN & C. F. GERLING.
SAUSAGE STUFFING MACHINE.
APPLICATION FILED MAY 16, 1904.

2 SHEETS—SHEET 1.

Witnesses
F. A. Parrow.
M. A. Schmidt

Henry J. Tiemann  Inventors
Christ F. Gerling
by Milo B. Stevens & Co. Attorneys No. 780,143. PATENTED JAN. 17, 1905.
H. J. TIEMANN & C. F. GERLING.
SAUSAGE STUFFING MACHINE.
APPLICATION FILED MAY 16, 1904.

2 SHEETS—SHEET 2.

Witnesses
F. A. Barron
M. A. Schmidt

Henry J. Tiemann
Christ F. Gerling
Inventors
by
Milo B. Stevens & Co. Attorneys

No. 780,143.

Patented January 17, 1905.

UNITED STATES PATENT OFFICE.

HENRY J. TIEMANN AND CHRIST F. GERLING, OF GERALD, MISSOURI.

SAUSAGE-STUFFING MACHINE.

SPECIFICATION forming part of Letters Patent No. 780,143, dated January 17, 1905.

Application filed May 16, 1904. Serial No. 208,119.

*To all whom it may concern:*

Be it known that we, HENRY J. TIEMANN and CHRIST F. GERLING, citizens of the United States, residing at Gerald, in the county of Franklin and State of Missouri, have invented new and useful Improvements in Sausage-Stuffing Machines, of which the following is a specification.

Our invention relates to a sausage-stuffing machine, and has for its object a simple and efficient machine of this kind.

A further object is to provide an improved closure and a quick return of the plunger.

With these and other objects in view the invention consists of certain novel features of construction hereinafter described, and pointed out in the claim, reference being had to the accompanying drawings, forming part hereof, in which—

Figure 1:
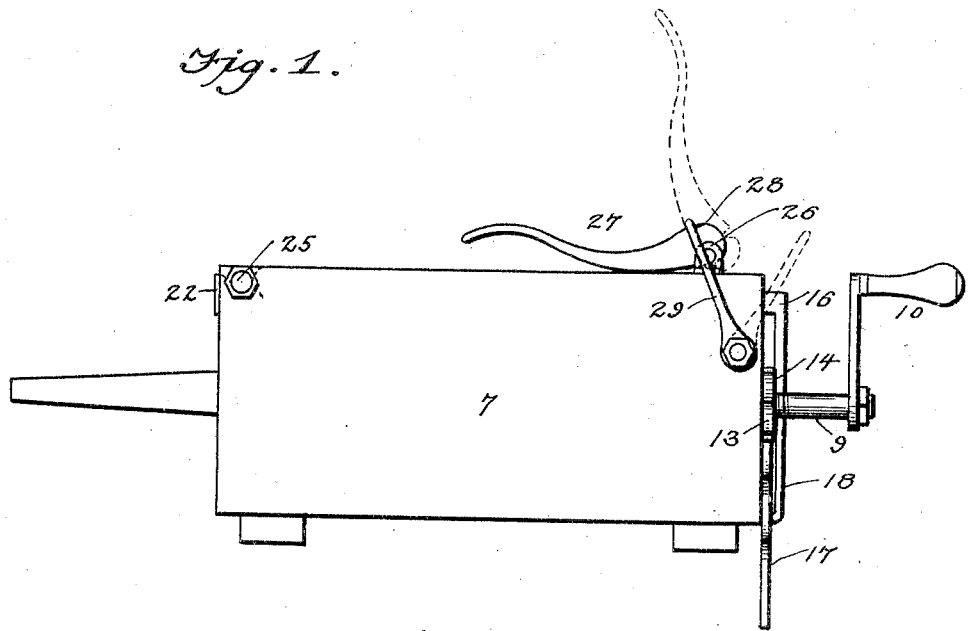
Figure 2:
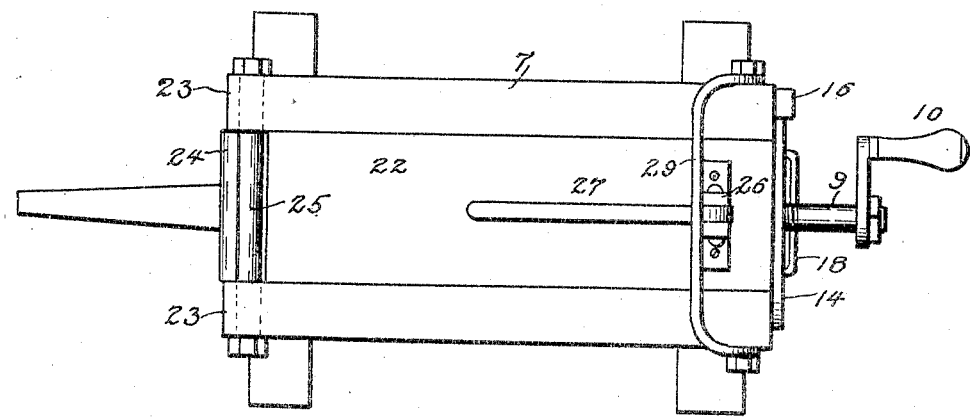
Figure 3:
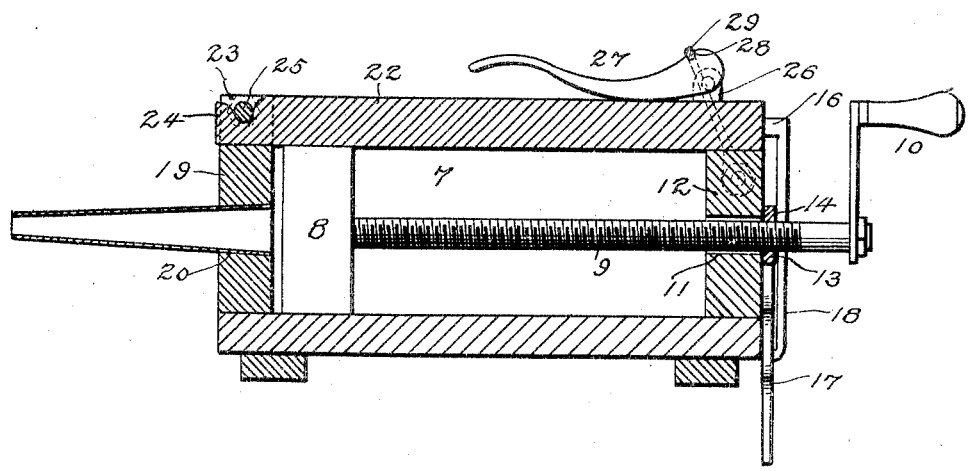
Figure 4:
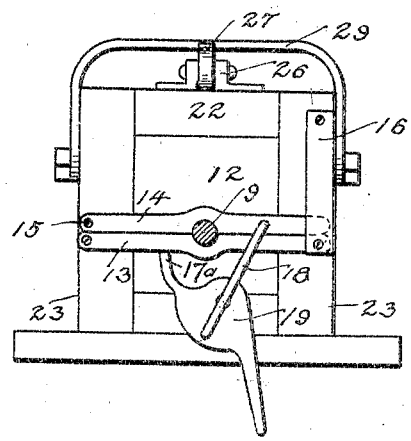
Figure 5:
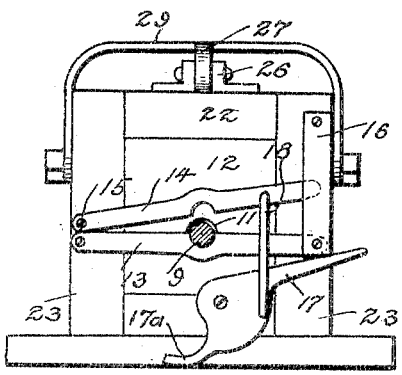

Figure 1 is a side elevation, and Fig. 2 a plan view. Fig. 3 is a central longitudinal section. Fig. 4 is an end view, and Fig. 5 is a similar view showing the screw-nut separated to permit a quick return of the plunger.

Referring specifically to the drawings, 7 denotes a box or casing in which a plunger 8 closely fits. A screw 9 operates the plunger, said screw having at its outer end a crank 10 for turning it. The screw extends loosely through a hole 11 in one end 12 of the box and is threaded through a nut secured to said end on the outside thereof. The nut is in two parts, 13 and 14, respectively, the first mentioned being fixed to the end 12 of the box and the other being pivoted thereto, as at 15, its outer end extending under a guide-strap 16. When a quick return of the plunger is desired, the two parts of the nut are separated, as shown in Fig. 5, after which the plunger can be readily pulled back, as the screw extends loosely through the hole 11. A lever 17 is pivoted to the end 12 and is connected to the movable part of the nut by a link 18, whereby the same is readily swung upwardly and disengaged from the screw. The lever 17 is cam-shaped, so that when the part 14 is pulled down into operative position it will be securely locked. The lever also has a footpiece 17$^a$, which extends against the fixed part 14 of the nut and limits the swing of the lever to prevent it from swinging too far and thus release the part 14 again. The opposite end 19 of the box has an opening 20 to receive a spout through which the material is discharged when the plunger is moved forwardly.

The lid of the box is indicated at 22 and fits closely between the side walls thereof. It has a reduced end 24, fitting under a rod 25, extending between the side walls 23 above the top of the end wall 19. To the opposite end of the lid ears 26 are secured, in which a cam-lever 27 is pivoted, the toe of which is notched, as at 28. A bail 29 is pivoted to the sides of the box, and by placing said bail into the notch 28 and swinging the cam-lever downwardly the lid will be securely clamped on the box. It can be readily removed by lifting up the cam-lever, as shown by dotted lines in Fig. 1, which permits the bail to be swung away from the lid and the same to be removed.

Having thus described our invention, what is claimed as new, and desired to be secured by Letters Patent, is—

A sausage-stuffing machine comprising a box containing a plunger, a screw for operating the same and extending loosely through one end of the box, a nut through which the screw is threaded, said nut comprising two parts, one of which is fixed to the box and the other is pivoted thereto, a cam-lever pivoted to the box, a link connection between the lever and the pivoted part of the nut, and a footpiece on the lever and extending against the fixed part of the nut to limit the swing of the lever.

In testimony whereof we have signed our names to this specification in the presence of two subscribing witnesses.

HENRY J. TIEMANN.
CHRIST F. GERLING.

Witnesses:
NEWTON CORKINS,
A. G. FITZGERALD.